Figure 5:
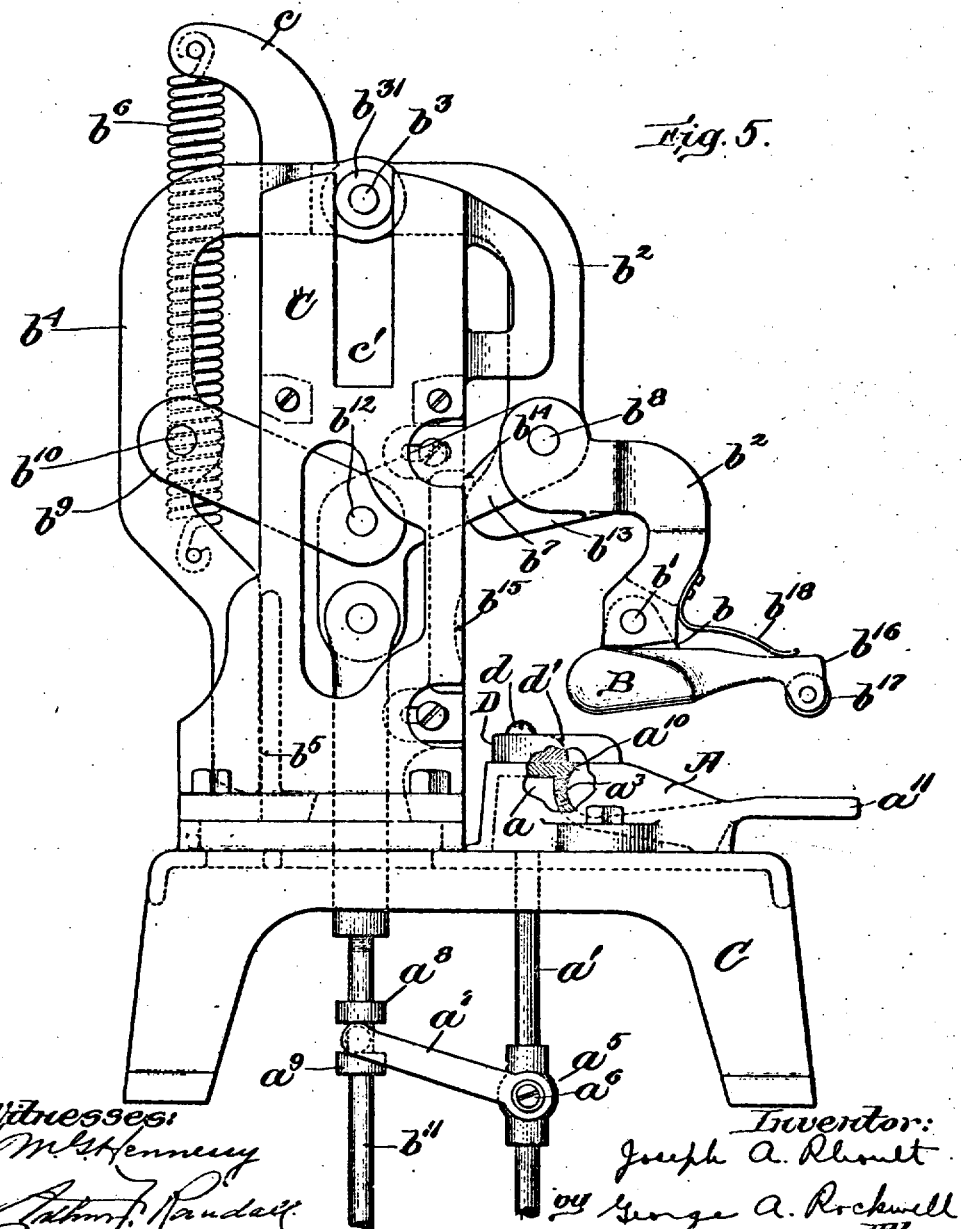

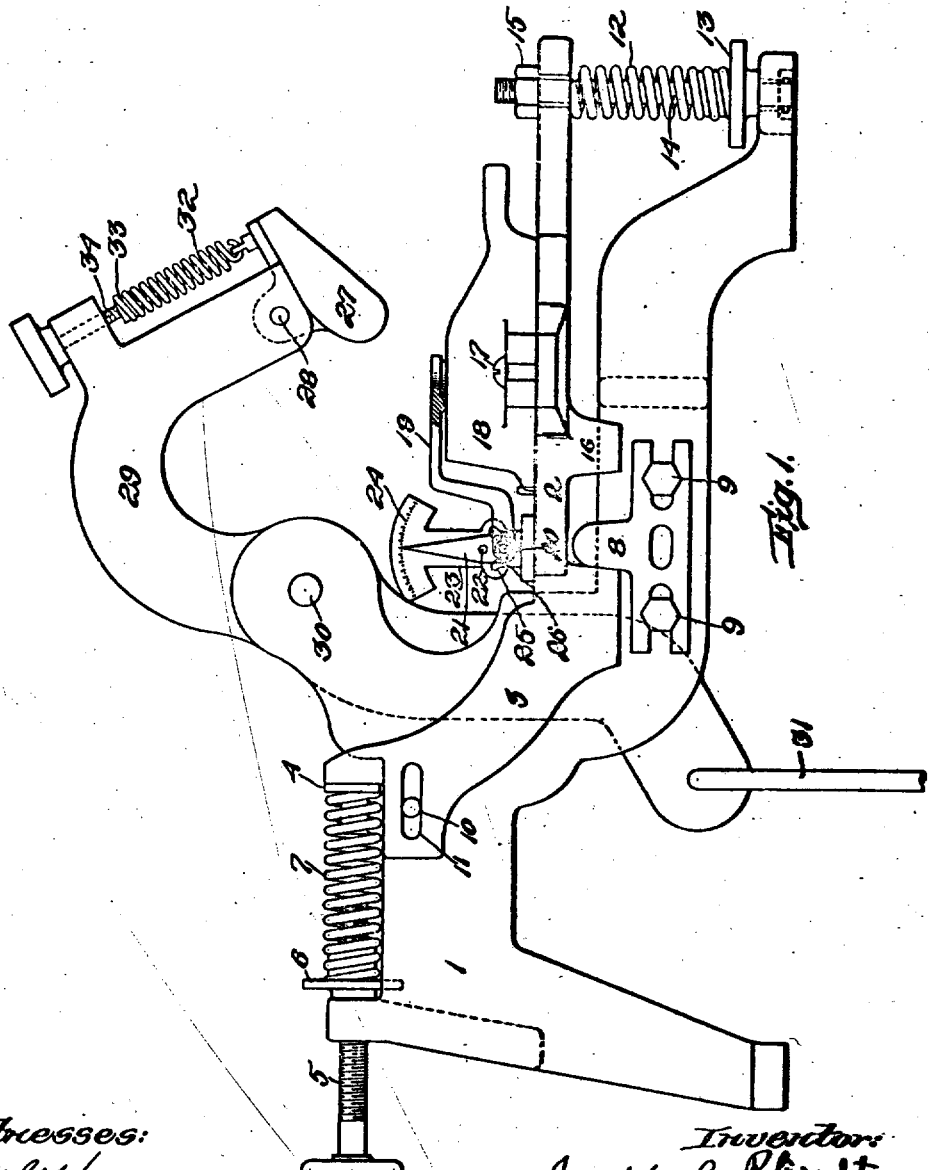

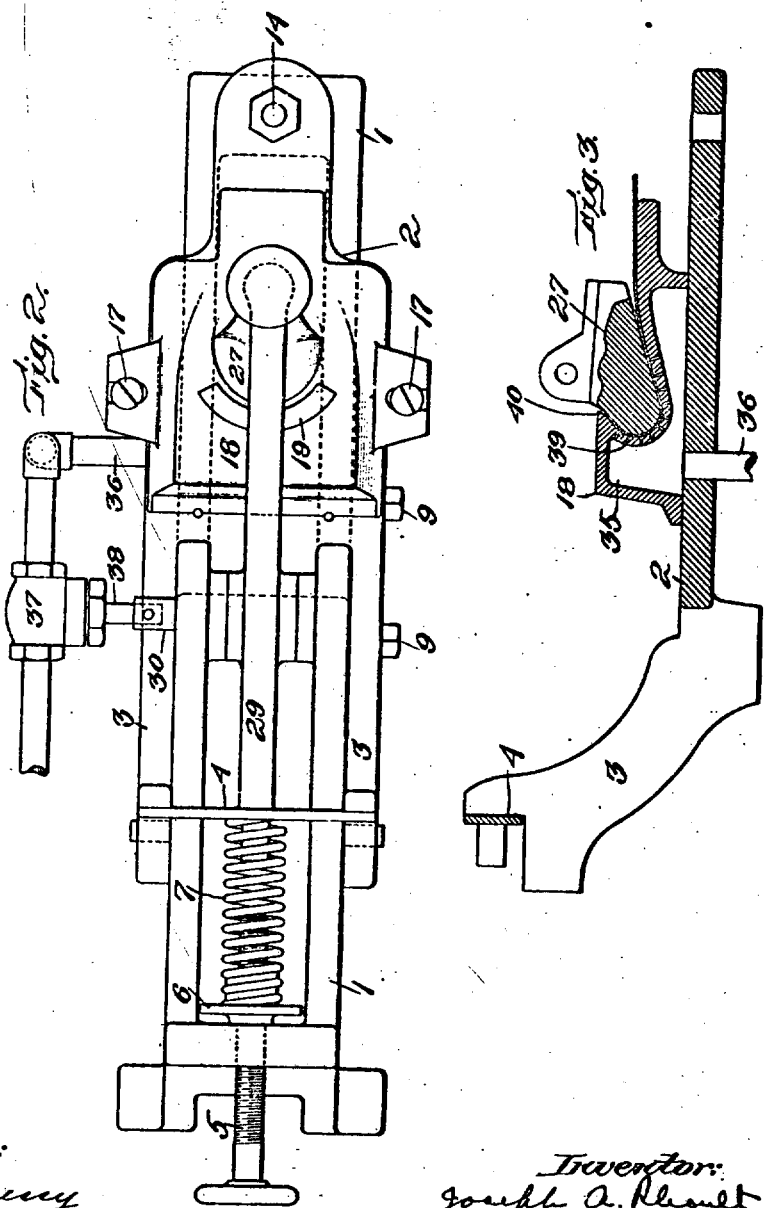

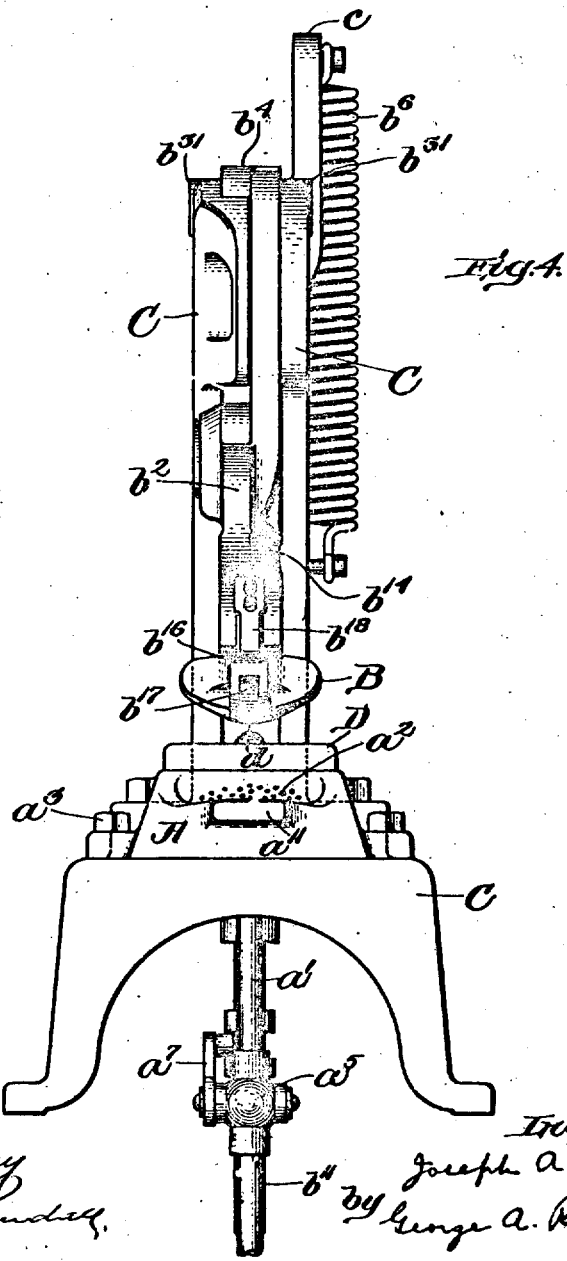

J. A. RHOULT.
MOLDING MACHINE.
APPLICATION FILED AUG. 16, 1907.

899,073.

Patented Sept. 22, 1908.
4 SHEETS—SHEET 4.

Witnesses:
Inventor:
Joseph A. Rhoult
by George A. Rockwell
Atty.

UNITED STATES PATENT OFFICE.

JOSEPH A. RHOULT, OF HAVERHILL, MASSACHUSETTS, ASSIGNOR OF ONE-HALF TO HARRIS W. SPAULDING, OF HAVERHILL, MASSACHUSETTS.

MOLDING-MACHINE.

No. 899,073.     Specification of Letters Patent.     Patented Sept. 22, 1908.

Application filed August 16, 1907. Serial No. 388,783.

*To all whom it may concern:*

Be it known that I, JOSEPH A. RHOULT, of Haverhill, in the county of Essex and State of Massachusetts, have invented a new and useful Molding-Machine, of which the following is a specification.

My invention relates to machines for shaping and molding articles of sheet material, and the object of my invention is to provide an improved machine of this kind and particularly to provide a machine which will be especially suited to mold toe-caps for boots and shoes.

A toe-cap for a boot or shoe is, as is well known, of a peculiar pocket-like shape, and it is a difficult operation to perfectly form and shape all parts thereof owing to the peculiar shape of mold required. My improved machine is peculiarly adapted to so treat the material of a blank as to give a perfect shape to the same.

My improved molding machine comprises a pair of dies, one of which is stationarily supported and the other movably supported. The movable die is shifted toward and from the stationary die by means which also acts to shift the movable die laterally so that the latter besides being forced into the stationary die so as to coöperate with the bottom of the latter is also forced sidewise to coöperate with its wall. In the best form of my invention the stationary die is supported so as to yield downwardly and sidewise under pressure from the movable die.

Another feature of my invention consists in providing means for heating the upper or blank being molded. To effect this the stationary die is preferably made with a steam chamber connected by a multiplicity of openings with the interior or molding portions of the stationary die and when the movable die is shifted to coöperate with the stationary die steam is automatically supplied to the chamber and passing through the openings contacts directly with the blank, and heats the die and aids the molding operation, and when the movable die is shifted away from the stationary die the supply of steam is automatically shut off.

Other features of my invention are hereinafter pointed out.

In the accompanying drawings Figure 1 is a side elevation of my improved molding machine; Fig. 2 is a plan view of the molding machine shown in Fig. 1; Fig. 3 is a sectional detail hereinafter described; Fig. 4 is a front elevation of another form of my invention; and Fig. 5 is a side view of the machine shown in Fig. 4.

Having reference to the drawings 1 is the frame of my improved molding machine and on this frame is yieldingly supported a bed 2 from which a pair of arms 3 project rearwardly, said arms being connected at their rear ends by the cross-bar 4. Mounted in frame 1 is a screw 5 carrying a nut 6 between which and cross-bar 4 is a spring 7 which tends to hold bed 2 in its forward position against a stop 8 adjustably fixed by screws 9 to frame 1. The rear end of bed 2 is supported by pins 10 projecting from frame 1 through slots 11 in the arms 3. The front end of bed 2 is supported by a spring 12 which rests upon a nut 13 adjustably mounted on a screw 14. At its lower end the screw 14 is loosely mounted in frame 1 so that it is free to rock, and at its upper end said screw projects loosely through bed 2 and carries a nut 15 against which said bed is held by spring 12. Downwardly projecting lugs 16 on bed 2 engage the sides of frame 1 and assist in holding said bed in proper position.

Fixed to the top of bed 2 by screws 17 is a stationary die 18 on top of which rests a gage 19. The rear end of gage 19 is connected by a bolt 20 with a pointer-lever 21 pivoted at 22 to a bracket 23 fixed to bed 2. Pointer-lever 21 coöperates with an index 24 on bracket 23. The bolt 20 projects through a slot 25 in bracket 23 so that the gage 19 can be adjusted for any desired size of upper or blank according to index 24. The gage is fixed in position by means of a nut 26.

The movable die 27 is pivoted at 28 to a lever 29 fulcrumed at 30 on frame 1, and the rear end of said lever is connected by a treadle rod 31, with a treadle not shown, by means of which lever 29 is operated. The front end of the die 27 is supported by a spring 32 which connects said die with a nut 33 mounted on a screw 34 on lever 29 so that adjustment of screw 34 regulates the tension of spring 32.

The stationary die 18, is, as shown in Fig. 3, hollow so as to provide a chamber 35 which is connected by a pipe 36 with the steam supply. In the pipe 36 is a valve 37 whose stem 38 is coupled to the fulcrum pin 30 of lever 29, said pin 30 being fixed in any suitable manner so as to turn with lever 29 so that when said lever is operated to shift die 27 toward and into the toe-shaped cavity of die 18, valve 37 is opened and steam is admitted in chamber 35. The interior wall of die 18 is made with a number of ports 39 which connect chamber 35 with the toe-shaped interior of die 18 so that when steam is admitted into chamber 35 it is brought into direct contact with the upper or blank being molded besides serving to heat the die 18. When die 27 is shifted toward die 18 the nose of die 27, shoving the blank before it, first engages the lip 40 on die 18 and shifts the latter rearwardly against the pressure of spring 7. Then as soon as the nose of die 27 becomes seated in die 18 the front portion of die 27 is swung downwardly against the pull of spring 32 and the resistance of spring 12. Thus the creases and folds which are produced around the edge of the blank or upper are pressed and rubbed or ironed into shape. Moreover, it will be seen that practically the whole of the toe is subjected to the pressure and action of the two dies.

In the form of my invention shown in Figs. 4 and 5 the stationary die A is fixed to the frame C and is made with a steam chamber $a$ connected by a pipe $a'$ with a steam supply. Ports $a^2$ connect chamber $a$ with the interior of die A as before. On top of die A is fixed by a screw $d$, a gage D having a rounded inner edge $d'$ to coöperate with the nose of the movable die B when the latter forces the blank or upper down over the lip $a^{14}$. The movable die B has a projecting ear $b$ pivoted at $b'$ to a lever $b^2$ which in turn is pivotally connected at $b^3$ to a slide $b^4$. The slide $b^4$ at its lower end rests against and is guided by a flange $b^5$ on frame C. The pin $b^3$ which connects lever $b^2$ and slide $b^4$ carries trunnions $b^{31}$ at its ends which ride in slots $c'$ in frame C. At the rear of frame C is an upwardly projecting arm $c$ to which is connected the upper end of a spring $b^6$. The lower end of spring $b^6$ connects with and supports the slide $b^4$. At $b^7$ and $b^8$ are the two members of a toggle which are pivoted, respectively, at $b^9$ and $b^{10}$ to the lever $b^2$ and slide $b^4$, the center pivot of the toggle being at $b^{12}$. The member $b^7$ has an extension at its inner end that is pivotally connected to the upper end of a treadle rod $b^{11}$ and this treadle rod $b^{11}$ carries two collars $a^8$ and $a^9$ engaging the end of an arm $a^7$ fixed to the stem $a^6$ of a valve $a^5$ located in pipe $a'$ so that when treadle rod $b^{11}$ is depressed valve $a^5$ is opened and steam is admitted to chamber $a$. On the lever $b^2$ is a nose or projection $b^{13}$ which rests against a bracket $b^{14}$ fixed to frame C, and in the path of this nose $b^{13}$ and on the bracket $b^{14}$ is a depression $b^{15}$ so that when treadle rod $b^{11}$ is depressed and die B is lowered into die A die B is shifted laterally to the left in Fig. 5 as soon as nose $b^{13}$ reaches depression $b^{15}$. This die B is forced entirely into die A against the wall of the latter. The front of die B is made with an extension $b^{16}$ carrying a roll $b^{17}$. The extension $b^{16}$ is normally depressed by a spring $b^{18}$ but as die B enters die A roll $b^{17}$ engages an extension $a^{11}$ on die A so that die B is rocked more or less in die A so as to rub the folds and creases produced by the crimping.

What I claim is:

1. In a molding machine the combination of a stationary die with a cavity bordered by an overhanging lip; a movable die; means to move the movable die into position to pass under the lip and then move it laterally into the stationary die and beneath said lip.

2. In a molding machine the combination of a stationary die with a cavity bordered by an overhanging lip; a movable die; a single member connected with the movable die to move it into position to pass under the lip and then move it laterally into the stationary die and beneath said lip.

3. In a molding machine the combination of a stationary die with a cavity bordered by an overhanging lip; a movable die; means to move the movable die into position to pass under the lip with the blank forced into the cavity of the stationary die and then move it laterally so as to force the blank under said lip to turn in the edges of the blank.

4. In a toe molding machine, in combination, a stationary die; a movable die; means to shift the movable die toward the stationary die to force the blank or the like into the latter, and then to shift the movable die laterally to force the blank against the side wall of the stationary die; and means to yieldingly support the stationary die against the perpendicular and lateral pressures of the movable die.

5. In a toe molding machine in combination a yieldingly supported stationary die; a movable die; and a lever with a stationary fulcrum on which the movable die is mounted, said lever being adapted to swing the movable die toward the stationary die to force the blank or the like into the latter and laterally so as to force the blank against the side wall of the stationary die.

6. In a toe molding machine in combination a stationary die having an under-cut, toe-shaped cavity; a toe-shaped movable die, and a lever on which the movable die is mounted, said lever being adapted to swing the movable die on an arc into and out of the undercut cavity of the stationary die.

7. In a toe-molding machine in combination a stationary die made with a toe-shaped cavity; a toe-shaped movable die; a lever on which the movable die is mounted, said lever being adapted to shift the movable die on an arc into and out of the stationary die; and means to yieldingly support the stationary die against the perpendicular and lateral thrust of the movable die.

8. In a toe molding machine, the combination of a stationary die having a toe-shaped cavity; a toe-shaped movable die; a lever support for the movable die by which the latter is shifted into and out of the stationary die; and a flexible joint between the movable die and its supporting lever to permit the movable die to rock while in engagement with the stationary die.

9. In a molding machine the combination of a stationary die; a movable die; means to shift the movable die toward the stationary die to force the blank or the like into the latter die and then laterally to force the blank against the wall of the stationary die; and means to yieldingly resist the lateral force.

10. In a toe molding machine, in combination, a stationary die made with a toe-shaped cavity; a toe-shaped movable die; a lever on which the movable die is mounted, said lever being adapted to swing the movable die toward the stationary die to force the blank or the like into the latter and laterally so as to force the blank against the side wall of the stationary die; a bed supporting the stationary die; a spring acting on the bed to oppose the lateral thrust of the movable die; and a spring acting on the bed to oppose the downward thrust of the movable die.

JOSEPH A. RHOULT.

Witnesses:
HAROLD S. LOCKWOOD,
HATTIE M. HARDING.